(12) United States Patent
Morris (10) Patent No.: US 7,987,203 B2
(45) Date of Patent: Jul. 26, 2011

(54) METHOD OF PROCESSING DATA FOR A SYSTEM MODEL

(76) Inventor: Stephen Morris, Coorparoo (AU)

( * ) Notice: Subject to any disclaimer, the term of this patent is extended or adjusted under 35 U.S.C. 154(b) by 0 days.

(21) Appl. No.: 10/567,071

(22) PCT Filed: Jul. 30, 2004

(86) PCT No.: PCT/AU2004/001013
§ 371 (c)(1),
(2), (4) Date: Feb. 3, 2006

(87) PCT Pub. No.: WO2005/015430
PCT Pub. Date: Feb. 17, 2005

(65) Prior Publication Data
US 2006/0287977 A1   Dec. 21, 2006

(30) Foreign Application Priority Data
Aug. 6, 2003  (AU) ............................... 2003904117

(51) Int. Cl.
*G06F 7/00*   (2006.01)
(52) U.S. Cl. ....................................... 707/793
(58) Field of Classification Search ............... 707/3, 793
See application file for complete search history.

(56) References Cited

U.S. PATENT DOCUMENTS

| | | | |
|---|---|---|---|
| 5,446,575 A | 8/1995 | Lysakowski, Jr. | |
| 5,446,885 A | 8/1995 | Moore et al. | |
| 6,438,547 B1 * | 8/2002 | Mehr et al. ........................ | 707/7 |
| 2002/0049749 A1 * | 4/2002 | Helgeson et al. .................. | 707/3 |
| 2002/0091908 A1 | 7/2002 | Ashida et al. | |

FOREIGN PATENT DOCUMENTS

EP   1286284 A1   8/2001

OTHER PUBLICATIONS

Seila, Andrew F. "Spreadsheet Simulation", Proceedings of the 2002 Winter Simulation Conference. WSC' 02. San Diego, CA, Dec. 8-11, 2002. Witkowski, Andrew et al. "Business Modeling Using SQL Spreadsheets", Proceedings of the 29th VLDB Conference, ACM, US, vol. 29, Dec. 9, 2003.
Benco, Daniel C. "Using Spreadsheet-Based Math Modeling in Small Business and Independent Consulting" Internet Citation, Jan. 1, 2004, pp. 1-8, URL:http://usasbe.org/knowledge/proceddings/proceedingsDocs/USASBE2004proceedings-Benco.pdf, Retrieved on Mar. 16, 2010.

* cited by examiner

*Primary Examiner* — Apu M Mofiz
*Assistant Examiner* — Ajith Jacob
(74) *Attorney, Agent, or Firm* — Neifeld IP Law, PC (57) ABSTRACT

A method for processing data for a system model including the steps of providing a model specification having a plurality of types of items including at least one first item type wherein associated data is obtained from data input into the system and at least one second item type wherein associated data is obtained from an operation performed on the data associated with at least one item stored in a first database, inputting data into the system, searching the input data for first item types, storing data associated with first item types in the first database, reading the or one of the second item types in a determining step including determining whether the first database includes the or each prerequisite item necessary to determine the one second item type by obtaining associated data from an operation performed on data associated with at least one item stored in the first data base, storing the one second item type in the first database if the or each prerequisite item is present, successively reading each other second item type and storing it in the first database if the or each prerequisite item is present in the first database and outputting an indication that the system model can be produced if items of the model specification are stored into the first database.

29 Claims, 2 Drawing Sheets

Model Input Data

Instance Data (name, instanceID and optional data)
Instance Data (name, instanceID and optional data)
.
.
.
Instance Data (name, instanceID and optional data)

← 17

Figure 1: Model Specification

Figure 2: Model Input Data

Figure 3: Method of Determining Item Instances

METHOD OF PROCESSING DATA FOR A SYSTEM MODEL

CROSS-REFERENCE TO RELATED APPLICATIONS

This application claims the benefit of International Application PCT/AU2004/001013, filed Jul. 30, 2004, which claims priority from Australian Patent Application Serial No. 2003904117, filed Aug. 6, 2003.

FIELD OF THE INVENTION

The present invention relates to the modeling of data using data processors such as computers.

In its preferred form the present invention relates to spreadsheet modeling. For convenience the invention will be described with reference to spreadsheet modeling but should be understood as having wider applications such as other modeling applications.

In the field of financial analysis computer models were originally developed to make it relatively quick and easy to examine many different scenarios and to calculate more complex indicators such as net present values. To assist in this regard several computer modeling systems were developed in languages such as FORTRAN to facilitate the construction of computer models.

Computer modeling systems had several attractive features including the ability to handle very complex calculations such as complex depreciation regimes and the maintenance of asset registers involving both depreciation and revaluation. Furthermore batch operation allowed several complex scenarios and sensitivities to be built and stored then run quickly when required. In addition computer modeling systems provided an ability to switch amongst alternatives or optional scenarios using available options.

However computer modeling systems suffered from significant problems including the high level of programming expertise required, especially if the logic of the model needed to be changed. In addition they were invariably inflexible, because decisions needed to be made in advance regarding the order in which calculations were to be performed. Furthermore, because calculations were carried out in computer code hidden from view third party users often regarded the systems as black boxes and had little confidence in the output.

As an alternative to computer modeling systems spreadsheet systems were developed which had the advantage of requiring little programming expertise and provided more intuitive methods for inputting data, for specifying formulae and for displaying results.

The spreadsheet system typically attempts to devise a schedule of calculations so that each cell value is calculated before the cell is itself required to be used in the calculation of cells which depend on it.

If such a schedule can be created the spreadsheet system calculates the cells.

Spreadsheet systems also have some drawbacks however. These include auditing problems associated with complex calculations where cell formula are cumbersome and difficult. In addition spreadsheet systems are typically poorly equipped for batch processing of complex and/or inter-related scenarios. Furthermore they have limited capability to switch amongst alternative or optional scenarios using options. Finally the lack of an interface for reading large amounts of input data can make data entry time consuming and prone to error.

Because of the above defects with spreadsheet modeling, modelers have tended to use two methods for creating complex spreadsheet models. These include comprehensive models involving the creation of a comprehensive spreadsheet containing all reasonably conceivable calculations that might be encountered in the particular field. This has the disadvantage of large storage and execution time overheads and the provision of features which are rarely if ever used.

Alternatively a standard model may be modified to handle calculations specific to the problem at hand. This naturally has the associated disadvantage of requiring considerable time and effort from the user in rewriting. This technique is also prone to errors.

SUMMARY OF THE INVENTION

An object of the present invention is to provide a computer implemented method for processing data for a spreadsheet system model, comprising:

providing a spreadsheet model specification in a computer system with a plurality of item types which may potentially be provided in the spreadsheet, including:

at least one first-type item for which input data is put into the computer system to indicate that said first-type item can be included in the spreadsheet; and at least one second-type item, wherein second-type items are putatively determinable from one or more operations performed on data stored in a first database, and wherein second-type items are included in the spreadsheet if ascertained to be determinable;

putting said input data into the system;

searching, using a processor for the computer system, the input data for a first-type item;

storing said first-type item found by the searching step in the first database, performing an iterative process to ascertain whether the first database includes one or more prerequisite items needed to determine a putative second-type item, wherein:

(a) each iteration comprises successively reading putative second-type items and ascertaining whether the first database includes prerequisite items sufficient to determine said putative second-type item, and if the first database does include prerequisite items sufficient to determine said second-type item, automatically storing that second-type item in the first database, such that said second-type item becomes available as a potential prerequisite item for other putative second-type items in subsequent iterations;

(b) the iterative process is automatically terminated when an iteration fails to store a second-type item in the first database which was not stored there in a previous iteration, thus indicating that all putative second-type items logically determinable from said stored data have been determined and stored in the first database; and (c) re-assessing in each iteration putative second-type items that could not be determined in previous iterations due to lack of a prerequisite item, by taking into account second-type items stored in the first database by previous iterations; and outputting an indication that the spreadsheet system model can be produced if items of the model specification are stored in the first database.

The present invention relates to a method of processing data which can be incorporated into spreadsheet modeling systems. In its preferred form the method can be incorporated in a hybrid spreadsheet modeling system incorporating the best features of computer modeling systems and spreadsheet systems.

According to one aspect of the present invention there is provided a method for processing data for a system model including the steps of providing a model specification having a plurality of types of items including at least one first item type wherein associated data is obtained from data input into the system and at least one second item type wherein associated data is obtained from an operation performed on the data associated with at least one item stored in a first database, inputting data into the system, searching the input data for first item types, storing data associated with first item types in the first database, reading the or one of the second item types in a determining step including determining whether the first database includes the or each prerequisite item necessary to determine the one second item type by obtaining associated data from an operation performed on data associated with at least one item stored in the first data base, storing the one second item type in the first database if the or each prerequisite item is present, successively reading each other second item type and storing it in the first database if the or each prerequisite item is present in the first database and outputting an indication that the system model can be produced if items of the model specification are stored into the first database.

Preferably each second item type (item of the second type) is read successively.

It is preferred that the method includes at least two items of the second type.

It is preferred that items include parameters or variables such as Revenue or Outlay in a financial model.

Associated data may include any type of data such as the name of items or quantities associated with the items.

According to one embodiment an item may include a group of parameters and their associated names.

It is preferred that the method incorporates an iterative process of reading second item types whenever a second item type is stored in the first database.

The first database should be understood as including any memory storage area with or without divisions into separate areas or separate databases.

Preferably the method includes storing first item types in modules within the first database.

Preferably each module is configured to perform operations on data associated with first item types (items of the first type) having at least one similar characteristic which are stored in the same module.

It is preferred that the method includes a sorting procedure as items and associated data are stored in the first database.

It is preferred that the system produces an output indication if predetermined items are stored in the first database.

It is preferred that the method includes nesting modules within other modules.

Preferably the method includes the step of determining whether a second item type can be stored in the first database by associating the second item type with an item determinant which specifies the or each prerequisite item for evaluation of the second item type.

Preferably the method includes a determinant step of searching the first database for the or each prerequisite item of the second item type.

The determining step is preferably interpreted in a broad sense to mean any operation, evaluation or process of arriving at an outcome.

The determinant and/or determining step may include a Boolean operation which produces a true or false result depending upon whether the or each prerequisite item is located in the first database.

The first database may include one or more separate storage areas.

Preferably the result is true if prerequisite items are located in the first database.

The first item types may correspond to input items.

The second item types preferably have corresponding item determinants.

Preferably the second item types are non-input items.

The method may include the step of adding a second item type to the first database if the associated item determinant evaluates to true.

The method may include the step of providing a consolidated storage area for storing items and for evaluating item determinants.

Preferably the method includes the step of evaluating the item determinant for each second item not stored in the first database.

The method may include the step of storing in the first database each second item type for which the item determinant is true.

The method preferably includes the step of storing second item types in a second database if their associated prerequisite items are not located in the first database.

Preferably the method includes repeating the evaluating step for any second item type in the second database.

Preferably the method includes repeating the storage step for each second item type stored in the second database.

It is preferred that the evaluating and storing steps are repeated until the storage step results in no additional second item types being added to the first database.

Alternatively the method includes repeating the evaluating and storing steps until all evaluated item determinants are false.

It is preferred that the second database comprises a consolidated instance array.

The method may include the step of adding second items for which the item instances evaluate to false to the second database.

It is preferred that any second item type added to the first database after the evaluating step is performed on the second database results in the removal of that second item from the second database.

It is preferred that the evaluation step is repeated on second item types remaining in the second database if the second item type is transferred to the first database.

The method may include the step of storing formula for second item types in a formula database.

The method may include evaluating each first and/or second item type stored in the first database in accordance with the associated formula stored in the formula database.

The method preferably relates to a spreadsheet model.

The method may include allocating rows or columns for each item in the first database.

The method may include the step of writing into the cells of the rows and columns the necessary formula from the formula database.

It is preferred that the method includes the step of writing into the cells of the rows and columns any other information including formatting requirements of the cells.

Alternatively the method includes the step of identifying first item types required for each second item type.

Preferably the method includes associating with each second item type all first item types and/or second item types required before the second item type can be evaluated.

The method may include storing second item types and associated first item types and/or second item types.

Preferably the method includes searching the first database for each second item type for an occurrence of each associated first item type and/or each second item type and storing the second item in the first database.

According to another aspect of the present invention there is provided a computer program for implementing the method for processing data for a system model in accordance with any one of the preferred features.

According to one aspect of the present invention the method is implemented by providing a model specification which is hard coded into the computer program which implements the invention.

The method may include incorporating a model specification with a plurality of preconfigured options which can be individually selected as the model specification.

According to one embodiment, the model specification is input into the system as a separate step.

According to an alternative embodiment the model specification is selected from a model specification database containing a plurality of optional model specifications.

According to another embodiment of the invention it is preferred that the model specification includes a plurality of operations associated with each second item type. Preferably the method includes selecting a model specification from the model specification database.

Alternatively, the method includes the step of inputting a desired model specification.

According to one embodiment, data associated with the second item type is derived from operations performed on data associated with prerequisite items for the second item type.

According to another embodiment of the invention the method includes items of other types.

Preferably data associated with an item of the second type can be determined directly from operations involving associated data rather than the items associated with that data.

According to another embodiment prerequisite items may include items of the first and/or second type.

According to another aspect of the present invention there is provided a storage medium for storing a computer program described above.

The words "comprising, having, including" should be interpreted in an inclusive sense, meaning that additional features may also be added.

BRIEF DESCRIPTION OF THE DRAWINGS

A preferred embodiment of the present invention will now be described by way of example only with reference to the accompanying drawings in which.

DETAILED DESCRIPTION OF THE INVENTION

In accordance with the preferred embodiment a spreadsheet model is produced by combining model input data for a particular model with a model specification.

The model builder uses the model specification to process the model input data to ultimately produce the spreadsheet model.

The process involves three main tasks:

identifying the items which must be created for a particular spreadsheet model;

allocating rows or columns for these items; and writing into the cells of those rows and columns the necessary formula or other information and formatting the cells.

The following description of the preferred embodiment incorporates the use of specially defined terms. These terms include:

item, item instance and item determinant.

In a financial model a particular parameter is evaluated according to a given formula or relationship between given variables. Thus a calculation of cash flow would be dependent upon the difference between Revenue and expenses. The particular names given to the variables is not important but they must be given some identifier and in this example they are each referred to as items having particular item names.

As shown in Table 1, items are not scalar quantities but rows which typically contain numbers or formulae and may have an associated name and label. Thus table 1 shows a very basic spreadsheet model with the items Revenue, Expenses and Cash Flow with different occurrences of the items appearing in columns C to H.

TABLE 1

| A three "item" model | | | | | | | |
|---|---|---|---|---|---|---|---|
| A | B | C | D | E | F | G | H |
| 1 | | | | | | | |
| 2 REVENUE | Revenue | 100 | 100 | 150 | 200 | 200 | 200 |
| 3 | | | | | | | |
| 4 EXPENSES | Expenses | 50 | 50 | 50 | 50 | 50 | 50 |
| 5 | | | | | | | |
| 6 CASHFLOW | Net Cash Flow | =C2−C4 | =D2−D4 | =E2−E4 | =F2−F4 | =G2−G4 | =H2−H4 |
| 7 | | | | | | | |

In each case there is only one instance of the items revenue, expenses and cash flow. Additional instances of each item might be referenced by terms such as Revenue 2, Expenses A, Cash Flow 2, Cash Flow A. Thus if the model included items Revenue 1 and Revenue 2, these would be considered different instances of the item revenue.

The Cash Flow is calculated by subtracting the Expenses in each column of row 4 from the Revenue in the corresponding column of row 2.

Another feature of the above example is that the items Revenue and Expenses would typically be input items and thus model input data which would be input to a computer by data entry personnel. The Cash Flow item however is not input to the system but is calculated from the input items Revenue and Expenses. Thus Cash Flow is evaluated based on two input items each having one instance.

From the above an instance can be defined as one or more lines which contain values copied from model input data and/or spreadsheet reference to model input data values, spreadsheet formula, labels and formatting information.

An instance as described above is a "concrete" entity in that it is defined in terms of actual lines on an actual spreadsheet. However, before a spreadsheet model can be created it is necessary to perform operations with putative instances to determine the actual instances that will be required.

The term "item instance" is introduced to refer to instances in the abstract. An item instance may be actual instances on an actual spreadsheet or it may be a putative instance on a putative spreadsheet.

There are two possible ways of approaching the definition of "Item Instance".

Firstly by working from the concrete to the abstract, starting with actual spreadsheets and from there defining "Instances", then "Items" as a class of actual or putative "Instance", and finally "Item Instance" as an actual or putative instance of an Item.

Secondly working from the abstract to the concrete, defining an "Item" as a class of variables (each Item defined by an unambiguous identifier, such as "REV") which might exist in a Model built from a Model Specification. An Item Instance can then be defined as an instance of the Item class.

With these definitions we may proceed to consider the first of three main tasks: determining which Item Instances should exist in a particular model built from a Model Specification and a set of Model Input Data.

In the simplest method of the invention an Item Instance can be brought into existence as follows:

if the Model Input Data contains input data for the Item Instance; and/or if the Item Instance is generated "internally" by the preferred method of the Invention. This process is described below.

In the method of the Invention, each Item must be associated with "Determination Information" which can be used to determine which Item Instances should exist. The Determination Information must comprise at least one of (a) or (b):

a) either:
   a designation that instances of the Item may be associated with Instance Data; or
   (ii) a Spreadsheet Modeling Language convention that allows instances of the Item to be associated with Instance Data. A Spreadsheet Modeling Language convention may allow for instances of an Item to be associated with Instance Data by default (i.e. instances of an Item may be associated with Instance Data unless expressly designated otherwise).
   Items which may have instances associated with Instance Data are referred to as "Input Items"; and/or
(b) a logical expression (an "Item Determinant") evaluated according to a set of rules such that it may be determined for which of all possible instances of the Item the expression is TRUE.

Thus an Item Instance should exist if:
the Item is an Input Item and the Item Instance has Instance Data included as part of Model Input Data; or
the Item has an Item Determinant and the Item Determinant evaluates to TRUE for the Item Instance.

To maintain the generality of the Invention, it is proposed that the rules for evaluating Item Determinants should not form part of the preferred method of the Invention but should be implementation dependent. The rules used in the computer program embodying the Invention are set out in the examples which follow.

Example 1

Model Specification with Input Item and Item Determinant

| Commands and Item Names | Label | Item Type Specifier and Qualifier |
|---|---|---|
| REV | Revenue | I |
| EXP | Expenses | I |
| CASHFLOW | Net cash flow | ND(REV ‖ EXP) |
| DRATE | Discount rate | I |
| NPV | Net present value | ND(CASHFLOW && DRATE) |

In this Model Specification:

there are five Items: REV, EXP, CASHFLOW, DRATE and NPV; the Determination Information is as follows:

Items REV, EXP and DRATE are Input Items as designated by the Item Type "I" but they have no Item Determinant. Therefore Instances of these Items can exist if and only if Instance Data has been provided for them;

Item CASHFLOW is a non-input Item as designated by the Item Type "N" but it has an Item Determinant "(REV‖EXP)". The Item Determinant is evaluated according to the rule that it is TRUE if a corresponding Instance of either REV or EXP exists, and FALSE otherwise; and Item NPV is a non-input Item as designated by the Item Type "N" but it has an Item Determinant "(CASHFLOW && DRATE0)". The Item Determinant is evaluated according to the rule that it is TRUE if a corresponding Instance of CASHFLOW exists AND a corresponding Instance of DRATE exists. Otherwise it is FALSE.

Note that according to this flow of logic, an Instance of NPV cannot exist unless there is a corresponding Instance of either REV or EXP. Yet, the Item Determinant for NPV contains no direct reference to either REV or EXP.

The following is a sample of Model Input Data which could be used with this Model Specification.

Example 2

Model Input Data

| |
|---|
| REV1 Steaming coal = 7*50 |
| REV2 Rental income = 7*10 |
| EXP1 Steaming coal = 7*25 |
| EXP3 Head Office = 4*10 3*0 |
| DRATE2 Discount rate = 10% |

When combined with the Model Specification, this Model Input Data would cause the following spreadsheet Model to be created.

Example 3

Resultant Spreadsheet Model

|    | A        | B               | C | D               |
|----|----------|-----------------|---|-----------------|
| 1  |          |                 |   |                 |
| 2  | REV1     | Steaming coal   |   | Cell Contents . . . |
| 3  | REV2     | Rental income   |   | Cell Contents . . . |
| 4  |          |                 |   |                 |
| 5  | EXP1     | Steaming coal   |   | Cell Contents . . . |
| 6  | EXP3     | Head Office     |   | Cell Contents . . . |
| 7  |          |                 |   |                 |
| 8  | CASHFLOW1| Steaming coal   |   | Cell Contents . . . |
| 9  | CASHFLOW2| Rental income   |   | Cell Contents . . . |
| 10 | CASHFLOW3| Head Office     |   | Cell Contents . . . |
| 11 |          |                 |   |                 |
| 12 | DRATE2   | Discount rate   |   | Cell Contents . . . |
| 13 |          |                 |   |                 |
| 14 | NPV2     | Net present value |  | Cell Contents . . . |
| 15 |          |                 |   |                 |

The Item Instances are determined as follows:

Instances of REV, EXP and DRATE exist if they have Instance Data (REV1, REV2, EXP1, EXP3 and DRATE2);

Instances of CASHFLOW exist if there is either a corresponding Instance of REV (CASHFLOW1 and CASHFLOW2) or a corresponding Instance of EXP (CASHFLOW1 and CASHFLOW3); and Instances of NPV exist if there is a corresponding Instance of CASHFLOW and a corresponding Instance of DRATE (NPV2).

The preceding section describes which Item Instances should exist in a particular Model built from a particular set of Model Input Data. But it remains to be shown how this is actually achieved in a computer program.

Figure 1:
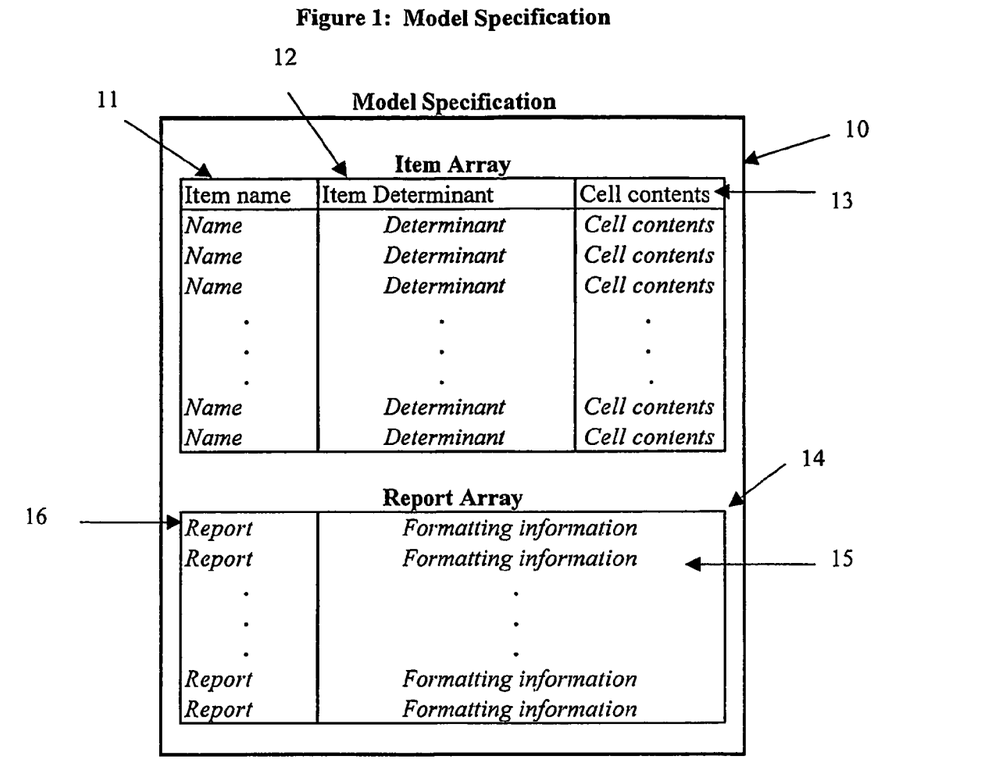
FIG. 1 shows a schematic representation of a model specification.

Referring to FIG. 1 a model specification 10 is established having item names 11, item determinants and cell content information 13. A report array 14 contains formatting information 15 for each type of report 16.

Figure 2:
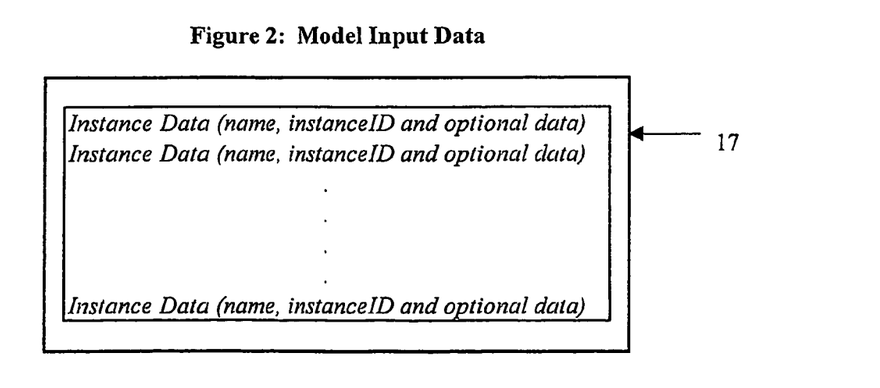
FIG. 2 shows a schematic representation of model input data.

As shown in FIG. 2, data which is input to the system is input as model input data 17 and is formatted with instance data including the name, instance ID and optional data.

Figure 3:
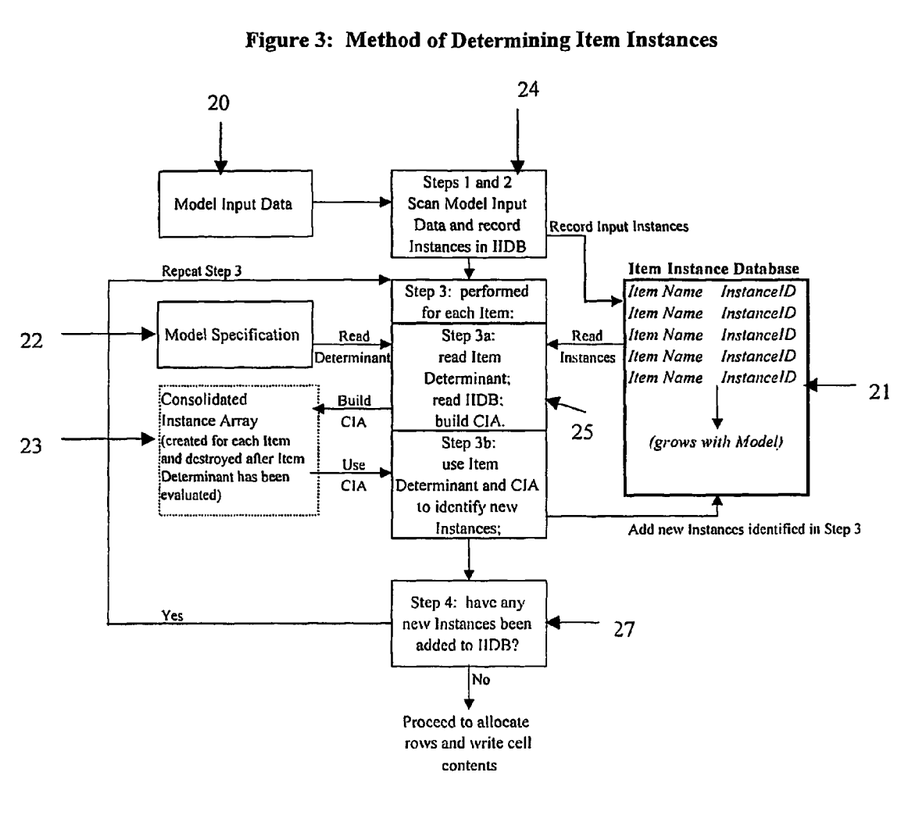
FIG. 3 shows a flow diagram of a method of processing data in accordance with the preferred embodiment of the invention.

As shown in FIG. 3 a modeling system for implementing a particular spreadsheet model consists of model input data 20, an item instance database 21, a model specification 22 and a consolidated instance array 23.

Processing of data occurs in accordance with the following four step procedure.

Initially in step 1 as identified by item 24, the model input data 20 is scanned for instance data. In step 2 the database 21 is created to register all the item instances (identified by item name and instance identifier) for which there is instance data. In step 3, once all the item instances identified in model input data have been registered in the item instance database 21, each item in the model specification 22 is read and the item determinant (if any) of each item is evaluated and the item instance database 21 has added to it all item instances for which the item determinant evaluates to true according to the rules of evaluation. This processing step is identified in block 25 of FIG. 3.

The results of evaluating item determinants may change due to the registration of additional item instances to the item instance database 21. Thus in a fourth step, step 4, it is necessary to repeat the evaluation step of step 3 to ascertain whether an item determinant would now evaluate to true for an item instance for which it previously evaluated to false.

For each item in each repetition of the evaluation step of step 3, the consolidated array 23 is established to store instance identifiers of the instances to be tested against an item determinant. Instance identifiers may be drawn from an operation on the item instances registered in the database 21 (for example the logical union of all instances of the item instances registered in the database) or from the application of a convention which identifies instances. The item determinant may be evaluated for each instance in the consolidated array 23. If it evaluates to true the item name and instance identifier are registered in the database 21.

As part of the process of reading each of the items in the model specification, step 3 which incorporates processing blocks 25 and 26 is repeated in step 4 until no more item instances are added to the item instance database. This is referenced in processing block item 27. Thus the addition of item instances to the item instance database 21 may change the evaluation of item determinants in step 3, but if step 3 results in no additional item instances being registered in the database 21 then no matter how many additional repetitions occur of step 3 this will not change any item determinant from false to true.

Applying these steps to Example 3, it will be seen that Item Instances REV1, REV2, EXP1, EXP3 and DRATE2 are registered in the Item Instance Database in Step 2 because they have Instance Data.

Instances of Item CASHFLOW are determined in Steps 3 and 4. In the current embodiment this is as follows:

all the Items referred to in the Item Determinant are identified. In Example 1, the Items REV and EXP are identified;

a Consolidated Instance Array 23 is created containing the union of the Instance Identifiers of all the instances of the Items thus identified already registered in the Item Instance Database. In Example 1, this would contain the Instance Identifiers "1" (derived from either REV and EXP), "2" (derived from REV) and "3" (derived from EXP). According to the rules of evaluation it is impossible for the Item Determinant to evaluate to TRUE for any other instance;

the members of the Consolidated Instance Array 23 are examined in order:

the Item Determinant evaluates to TRUE for Instance Identifier "1" because the corresponding Item Instance of REV (i.e. REV1) is already recorded in the Item Instance Database. It is not necessary to consider the existence of EXP1;

the Item Determinant evaluates to TRUE for Instance Identifier "2" because the corresponding Item Instance of REV (i.e. REV2) is already recorded in the Item Instance Database; and the Item Determinant evaluates to TRUE for Instance Identifier "3" because the corresponding Item Instance of EXP (i.e. EXP3) is already recorded in the Item Instance Database.

The three Item Instances CASHFLOW1, CASHFLOW2 and CASHFLOW 3 are therefore registered in the Item Instance Database; and In Step 4, this process is repeated. There are no more Item Instances of Item CASHFLOW added to the Item Instance Database in this step.

The issue of whether the process can finish depends on whether instances of any item have been added in the most recent pass of step 3.

It is possible for some instances of an item to be added in, say, the first pass of step 3, none added in the second pass, but more added in the third pass. However, if no instances of any item have been added then the model is complete.

Instances of Item NPV are also determined in Steps 3 and 4. In the current embodiment this is as follows:

- all the Items referred to in the Item Determinant are identified. In Example 1, the Items CASHFLOW and DRATE are identified;
- a Consolidated Instance Array is created containing the union of the Instance Identifiers of all the instances of the Items thus identified already registered in the Item Instance Database. Assuming that NPV is processed before CASHFLOW in the first pass of step 3, this would contain the Instance Identifiers "2" (derived from DRATE). No Instances of CASHFLOW exist at this stage;
- the members of the Consolidated Instance Array are examined in order:
  - the Item Determinant evaluates to FALSE for Instance Identifier "2" because the corresponding Item Instance of CASHFLOW (i.e. CASHFLOW2) is not registered in the Item Instance Database at this stage.
- No Instances of NPV are registered in the Item Instance Database at this stage;
- In Step 4, this process is repeated. By this time Item Instances CASHFLOW1, CASHFLOW2 and CASHFLOW3 have been registered;
- a Consolidated Instance Array is registered containing the union of the Instance Identifiers of all the instances of the Items identified in the Determinant and already registered in the Item Instance Database. This would now contain the Instance Identifiers "1" (derived from CASHFLOW), "2" (derived from either CASHFLOW or DRATE) and "3" (derived from CASHFLOW);
- the members of the Consolidated Instance Array are examined in order:
  - the Item Determinant evaluates to FALSE for Instance Identifier "1" because the corresponding Item Instance of DRATE (i.e. DRATE1) is not registered in the Item Instance Database;
  - the Item Determinant evaluates to TRUE for Instance Identifier "2" because the corresponding Item Instances of both CASHFLOW (i.e. CASHFLOW2) and DRATE (i.e. DRATE2) are already registered in the Item Instance Database; and
  - the Item Determinant evaluates to FALSE for Instance Identifier "3" because the corresponding Item Instance of DRATE (i.e. DRATE3) is not registered in the Item Instance Database;
- Only the Item Instance NPV2 is registered in the
- Item Instance Database; and
- the process is repeated again. As there are no more Item Instances added to the Item Instance Database in this step, the process can finish.

It is possible in principle that an Item Instance could be added in Step 3 or on one of the repetitions of Step 3 and that in a later repetition of Step 3 the Item Determinant will evaluate to FALSE for that Item Instance (perhaps because other Item Instances have been added). A particularly problematic example of this is shown below. (The symbol "!" stands for the logical operator "NOT".)

Example 4

Contradictory Item Determinants

| Commands and Item Names | Label | Item Type Specifier and Qualifier |
|---|---|---|
| Item A | | ND(ItemC && !ItemB) |
| Item B | | ND(ItemC && ItemA) |
| Item C | | I |

In Example 4, if an instance of Item C has been created from Instance Data then the corresponding instance of Item A should exist if and only if the corresponding instance of Item B does not exist. But the corresponding instance of Item B should exist if and only if the corresponding instance of Item A exists. This is a logical contradiction which cannot be eliminated.

The method of the Invention handles this by adding Item Instances to the Item Instance Database but not deleting them. It is therefore possible that the final version of a Model might contain some redundant Item Instances. With good model specification this should not happen and, if necessary, redundant Instances can be "neutralised" using cell content information.

Allocating Rows or Columns

Once the Item Instances necessary for a Model have been determined, it is possible to allocate rows or columns to the Instances.

It is proposed that the method of allocating rows and columns be implementation dependent so as not to limit the generality of the Invention. In particular:

- it is not essential for all rows or columns to be on a single spreadsheet. The Spreadsheet Modeling Language might contain methods of specifying that different Item Instances appear on different sheets, or that a Non-defining Occurrences of an Item Instance appear on different sheet from the Defining Occurrence; and
- it is not essential for a row or column to occupy the entire width or length of a spreadsheet. The term "Spreadsheet Fragment" is used to describe a single rectangular portion of a spreadsheet which is of sufficient size to accommodate a particular Model. This allows several (possibly interacting) Models to be built on a single spreadsheet. This does not prevent a Spreadsheet Fragment from being an entire spreadsheet, but it need not be.

In the examples it is assumed that a Model Specification is read sequentially. As each Item is encountered, a row or column is reserved for each Item Instance. Blank spaces or other formatting controls embedded in the Model Specification may be used to indicate empty lines, column headers, underlines, changes in number formats, or page breaks.

The preferred embodiment has been described having regard to model specifications which are primarily externally sourced. However, the invention also includes model specifications which are hard coded into a computer program or computer. For example, a comprehensive model specification can be provided prior to use of the method. Binary data generated by the compiler could be removed and could be printed out as a set of integers. This could be hard coded into C++ source code in a software implementation as a constant integer array. The software program could then be distributed with a comprehensive model specification already hard coded into it. In such a situation any user of the method would be able to select a desired model specification from a multitude of different options which are hard coded into it.

It is to be understood that, if any prior art publication is referred to herein, such reference does not constitute an admission that the publication forms a part of the common general knowledge in the art, in Australia or in any other country.

What I claim is:

1. A computer implemented method for processing data for a spreadsheet system model, comprising:
   providing a spreadsheet model specification in a computer system with a plurality of item types which may potentially be provided in the spreadsheet, including:
   at least one first-type item for which input data is put into the computer system to indicate that said first-type item can be included in the spreadsheet; and
   at least one second-type item, wherein second-type items are putatively determinable from one or more operations performed on data stored in a first database, and wherein second-type items are included in the spreadsheet if ascertained to be determinable;
   putting said input data into the system;
   searching, using a processor for the computer system, the input data for a first-type item;
   storing said first-type item found by the searching step in the first database,
   performing an iterative process to ascertain whether the first database includes one or more prerequisite items needed to determine a putative second-type item, wherein:
   (a) each iteration comprises successively reading putative second-type items and ascertaining whether the first database includes prerequisite items sufficient to determine said putative second-type item, and if the first database does include prerequisite items sufficient to determine said second-type item, automatically storing that second-type item in the first database, such that said second-type item becomes available as a potential prerequisite item for other putative second-type items in subsequent iterations;
   (b) the iterative process is automatically terminated when an iteration fails to store a second-type item in the first database which was not stored there in a previous iteration, thus indicating that all putative second-type items logically determinable from said stored data have been determined and stored in the first database; and
   (c) re-assessing in each iteration putative second-type items that could not be determined in previous iterations due to lack of a prerequisite item, by taking into account second-type items stored in the first database by previous iterations; and outputting an indication that the spreadsheet system model can be produced if items of the model specification are stored in the first database.

2. The method of claim 1, wherein said first database further comprises modules; and, said method further comprising the step of storing said first-type items in said modules.

3. The method of claim 2, further comprising: configuring each said module to perform operations on said first-type items having at least one similar characteristic which are stored in the same module.

4. The method of claim 1, further comprising the step of sorting said first- and second-type items as they are stored in the first database.

5. The method of claim 1, wherein said first- and second-type items comprise predetermined items.

6. The method of claim 1, wherein each second-type item is associated with an item determinant which specifies each prerequisite item for evaluation of the second-type item.

7. The method of claim 6, comprising a determining step of searching the first database for each prerequisite item of the second-type item.

8. The method of claim 7, wherein the determining step includes a Boolean operation which produces a true or false result depending on whether each prerequisite item is located in the first database.

9. The method of claim 8, wherein the first database includes one or more separate storage areas.

10. The method of claim 8, wherein the result of said determining step is true if each prerequisite item is located in the first database.

11. The method of claim 10, comprising storing a second-type item in the first database if the associated item determinant evaluates to true.

12. The method of claim 11, further comprising the step of providing a consolidated storage array for storing items of the second type and for evaluating said item determinants.

13. The method of claim 12, further comprising the step of evaluating the item determinant for each said second-type item not stored in the first database.

14. The method of claim 13, comprising the step of storing said second-type items in a second database if associated prerequisite items for said second-type items are not located in the first database.

15. The method of claim 14, comprising the step of repeating the evaluating step for any said second-type items in the second database.

16. The method of claim 15, wherein the second database comprises a consolidated instance array.

17. The method of claim 16, further comprising the step of adding said second-type items for which the item determinants evaluate to false to the second database.

18. The method of claim 17, wherein any said second-type item stored in the first database after the evaluating step is performed on the second database is removed from the second database.

19. The method of claim 18, wherein the evaluation step is repeated on said second-type items remaining in the second database at least one further time after any second-type item is transferred to the first database.

20. The method of claim 1, further comprising the step of storing formulae for said second-type items in a formula database and evaluating each said first and/or second-type item stored in the first database in accordance with an associated formula stored in a formula database, and associating with each said second-type item all of said first- and/or second-type item types required before the said second-type item can be determined.

21. The method of claim 1, wherein the computer system determines which second-type items to read by determining which second-type items could exist, based on data in the first database.

22. The method of claim 1, wherein the spreadsheet model specification includes said at least two second-type items by at least one of: listing a plurality of second-type items; or, defining one or more classes of the second-type item, from which a number of unambiguously identifiable second-type items can be determined.

23. The method according to claim 12, wherein one or more iterations of the iterative determining process comprises generating one or more putative second-type items for subsequent reading and assessment.

24. The method of claim 1, wherein at least one putative second-type item is provided which can be assessed as being able to be determined only if: the first database includes one or more prerequisite items necessary to determine said second-type item; and the first database does not include one or more other specific first or second type items, not being prerequisite items of said putative second-type item.

25. A computer implemented method for processing data for a spreadsheet system model, including the steps of:
   providing a spreadsheet model specification in a computer system, the spreadsheet model specification including a plurality of types of item, in respect of which entries may potentially be provided in a spreadsheet to which the spreadsheet system model relates, the types of item including:
   at least one first-type item for which input data is input into the computer system; and
   at least one putative second-type item wherein second-type items are putatively determinable from operations performed on data stored in a first database, associated with at least one of said first or second type items and wherein second-type items are included in the database if ascertained to be determinable;
   searching, using a processor for the computer system, the input data for a first-type item;
   storing said first-type item found by the searching step, in the first database,
   performing an iterative process, using the processor, to ascertain whether the first database includes one or more prerequisite items necessary to determine a putative second-type item, the iterative determining process comprising performing a plurality of iterations, wherein:
   (a) each iteration comprises successively automatically reading a putative second-type item;
   associating that second-type item with an item determinant which specifies each prerequisite item for evaluation of that second-type item;
   for each second type item, searching the first database for each prerequisite item for said second-type item;
   applying a Boolean operation which produces a true or false result depending on whether each prerequisite item is located in the first database; and storing in the first database the second-tpe item if the item determinant is true; and
   (b) the iterative determining process performs repeated iterations according to step (a) indefinitely until an iteration evaluates the determinants of all second-type items not stored in the first database in previous iterations as false; and
   automatically outputting, using the processor, an indication that the spreadsheet system model can be produced if items of the model specification are stored into the first database.

26. The method of claim 1, wherein in the iterative determining process comprises successively automatically reading only second-type items not previously stored in the first database.

27. The method of claim 1, including at least two second-type items.

28. The method of claim 1, wherein storing an item in the first database comprises storing data associated with that item in the first database, said data associated with that item being a name or other flag indicative of the particular item.

29. The method of claim 1, implemented by providing a model specification which is hard coded into the computer program.

* * * * *